C. H. FRAKES.
TONGS.
APPLICATION FILED AUG. 6, 1913.
1,119,419.
Patented Dec. 1, 1914.
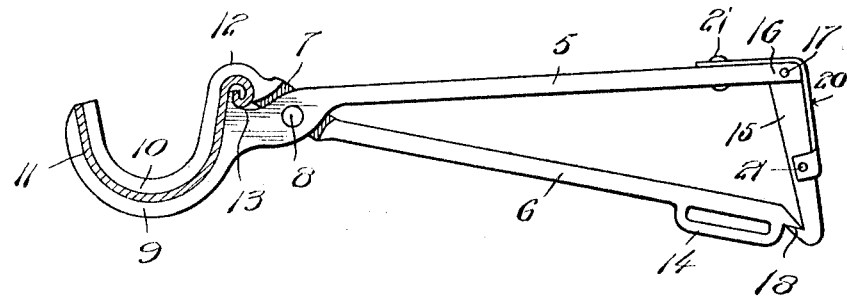
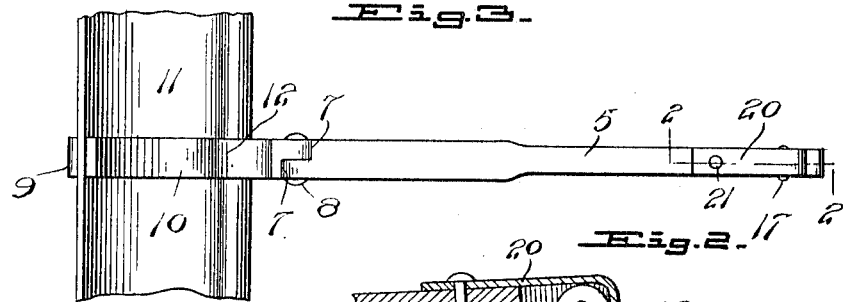
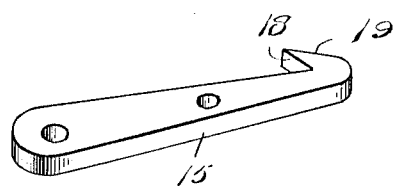
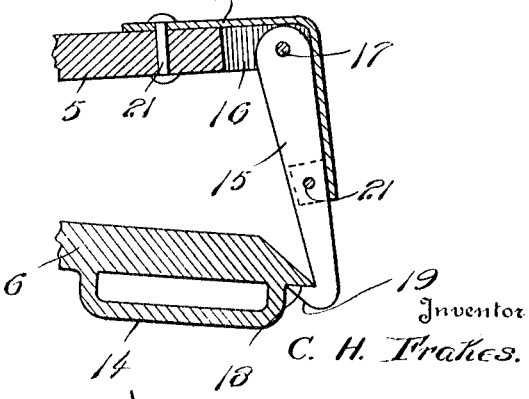
Inventor
C. H. Frakes.
Witnesses
Attorneys

UNITED STATES PATENT OFFICE.

CHARLES H. FRAKES, OF BERTRAND, NEBRASKA.

TONGS.

1,119,419.   Specification of Letters Patent.   Patented Dec. 1, 1914.

Application filed August 6, 1913. Serial No. 783,403.

*To all whom it may concern:*

Be it known that I, CHARLES H. FRAKES, a citizen of the United States, residing at Bertrand, in the county of Phelps, State of Nebraska, have invented certain new and useful Improvements in Tongs; and I do hereby declare the following to be a full, clear, and exact description of the invention, such as will enable others skilled in the art to which it appertains to make and use the same.

This invention relates to new and useful improvements in devices such as tongs and pliers.

The object of the present invention resides particularly in the provision of tongs, whereby eave troughs may be grasped and held while they are being soldered into place and the invention further contemplates the provision of means for automatically locking the gripping jaws of the tongs in intimate relation so that the trough may be grasped and the tongs automatically locked thereon, thus obviating the necessity of the operator exerting a gripping action on the tongs during the entire time the trough is being held thereby.

A further object of the invention is to simplify the general structure and improve the efficiency of devices of this character.

With these and other objects in view, the invention resides in the novel combination, formation and arrangement of parts to be more fully hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a side elevational view of the improved tongs holding an eave trough, Fig. 2 is a sectional view on the line 2—2 of Fig. 1, Fig. 3 is a top plan view of what is shown in Fig. 1, and Fig. 4 is a perspective view of the locking link.

Referring now more particularly to the accompanying drawings, the tongs are shown as comprising upper and lower handle portions 5 and 6 respectively, provided at their forward portions with cutaway parts 7 pivotally connected by the rivet 8. The upper handle portion is extended to form a lower or receiving jaw 9 and the lower handle portion is extended to form a clamping jaw 10. These jaws are arcuate in shape to receive therebetween the trough 11. For seating the bead of the trough, the upper jaw 9 is provided adjacent the cutaway part 7 with an upwardly bowed portion 12 and the lower jaw 9 is thickened adjacent its cutaway portion and has the top portion thereof cutaway at 13. Thus the jaws are adapted to clampingly engage the trough throughout their entire lengths.

To protect the hands of the operator, the lower jaw is provided with a guard portion 14 terminating at its ends in lateral extensions secured to and preferably integral with the outer end portion of the handle.

For automatically locking the jaws in intimate relation, a link 15 is provided and pivotally held between furcations 16 at the end of the upper handle by a pin 17. The end of the link 15 is cutaway to free portion of the link 15 is cutaway to provide a shoulder 18 and the free end of the link is leveled as at 19. The end of the lower handle portion 6 of the tongs is also beveled so that when the handle portions are brought together the beveled portion of the link will engage the beveled portion of the lower handle and cause the link to swing outwardly. A spring 20 is provided for normally swinging the link inward and this spring comprises an angular leaf spring secured at its ends at 21 to the link and the lower handle portion. The spring is thus limited in its inward swinging movement. Therefore when the handle portions are brought together, the link will automatically engage over the end of the lower handle portion and thus clamp the jaws together.

From the foregoing it is observed that a very simple structure has been provided which will efficiently perform the functions normally required thereof.

What is claimed is:

A device of the class described comprising a pair of handle portions pivoted together and terminating in coöperating jaws, said jaws being arcuate in shape to receive a trough therebetween, one of said jaws being bowed at its inner end, and a thickened portion at the inner end of the other jaw cut away to provide with the bowed portion a space for seating the bead of the trough, and also to provide a projection extending within the recess formed by the bowed portion and constituting a support for the inner side of the bead.

In testimony whereof, I affix my signature, in the presence of two witnesses.

CHARLES H. FRAKES.

Witnesses:
ROSCOE J. SLATER,
HILDA CARLSON.